United States Patent [19]

Kondo et al.

[11] 4,156,825
[45] May 29, 1979

[54] PIEZOELECTRIC HIGH VOLTAGE GENERATING DEVICE

[75] Inventors: Kaneichi Kondo; Kunitoshi Kawano; Yuji Shingu, all of Kadoma, Japan

[73] Assignee: Matsushita Electric Industrial Company, Limited, Japan

[21] Appl. No.: 903,775

[22] Filed: May 5, 1978

[30] Foreign Application Priority Data

May 6, 1977 [JP] Japan .................. 52-57956[U]

[51] Int. Cl.² .......................................... H01L 41/10
[52] U.S. Cl. ...................................... 310/339; 361/260
[58] Field of Search ........................................ 310/339

[56] References Cited

U.S. PATENT DOCUMENTS

| 3,101,420 | 8/1963 | Huffero et al. | 310/339 |
| 3,208,443 | 9/1965 | Hurwitz | 310/339 X |
| 3,350,583 | 10/1967 | Schiavone | 310/339 X |
| 3,867,653 | 2/1975 | Duetze | 310/339 |
| 3,948,238 | 4/1976 | Jamieson | 310/339 X |
| 4,091,302 | 5/1978 | Yamashita | 310/339 |

*Primary Examiner*—Mark O. Budd

*Attorney, Agent, or Firm*—Lowe, King, Price & Becker

[57] ABSTRACT

The present invention provides a high voltage generating device utilizing a piezoelectric element. The device comprises an outer rotary member having a plurality of saw tooth-like cam lobes formed on its outer circumference equidistant from each other and an inner rotary member disposed in the outer rotary member. A cam follower for applying an impact to a piezoelectric element is biased toward the outer rotary member to cooperate with one of the cam lobes. The inner rotary member has a ball mounted therein and a spring for biasing the ball radially outwardly into operative engagement with an inner surface of the outer rotary member. The inner surface of the outer rotary member is so constructed and arranged as to permit free rotation of the inner rotary member unless the inner rotary member is depressed and turned in a predetermined direction. Under this condition the outer rotary member will rotate in the same rotational direction to cause the cam lobes to actuate the cam follower at several times, thus causing the piezoelectric element to produce a series of sparks.

4 Claims, 6 Drawing Figures

PIEZOELECTRIC HIGH VOLTAGE GENERATING DEVICE

BACKGROUND OF THE INVENTION

The present invention relates to a high voltage generating device which produces a high voltage by applying an impact to a piezoelectric element, and more particularly to a high voltage generator which may be used as an ignitor for a gas equipment, such as a gas oven.

Most of the conventional high voltage generating device which may be used as an ignitor are designed to provide a single spark upon each manipulation, increasing the frequency of ignition failure. However, known high voltage generating devices that are designed to provide a series of sparks upon each manipulation require a wide manipulation angle of instrument thereof and great effort for the manipulation.

SUMMARY OF THE INVENTION

It is therefore an object of the present invention to provide a high voltage generating device which provides a series of sparks upon each manipulation and which is easy to manipulate with light effort.

BRIEF DESCRIPTION OF THE DRAWINGS

The present invention will be further described along with a preferred embodiment illustrated in the accompanying drawings, in which.

DESCRIPTION OF PREFERRED EMBODIMENT

Figure 1:
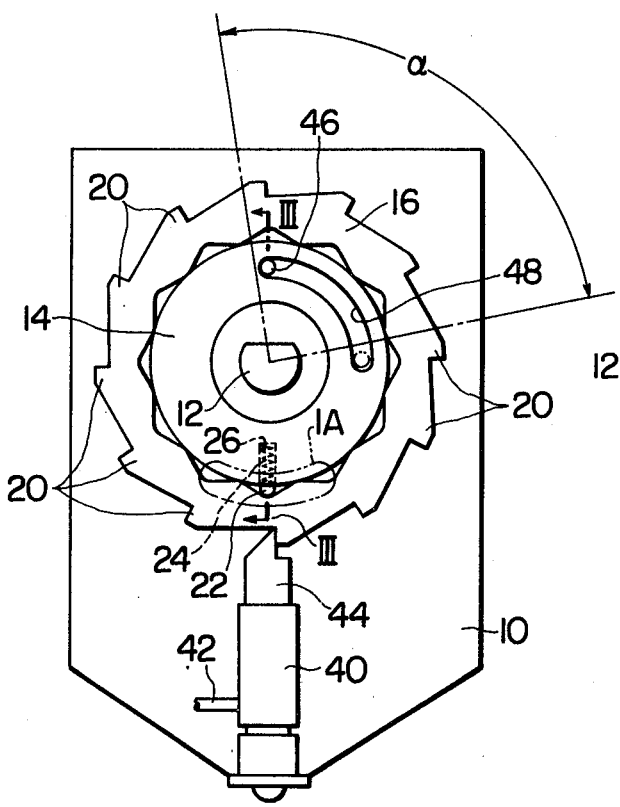
FIG. 1 is a front elevation of a high voltage generating device according to the present invention.
Figure 2:
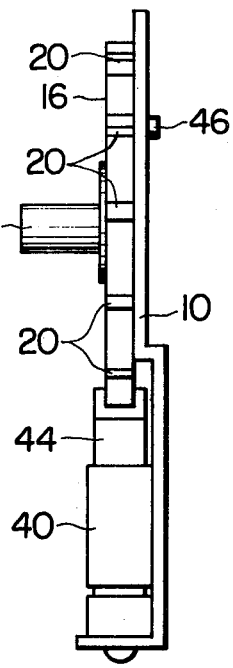
FIG. 2 is a side elevation of the high voltage generating device.

Referring to FIGS. 1, 1A, 1B and 2 of the accompanying drawings, the reference numeral 10 denotes a panel; the reference numeral 12 denotes a manually operable shaft; the reference numeral 14 denotes an inner rotary disc member movable with the manually operable shaft 12; and the reference numeral 16 denotes an outer rotary annular member rotatably mounted on the panel 10. The outer rotary member 16 has an inner surface 18 defining an axial bore in which the inner rotary member is disposed for rotation about and longitudinal movement along an axis of rotation of the outer rotary member 16, and it has a plurality (twelve in number in this embodiment) of saw tooth-like cam lobes 20 on its circular outer circumference equidistant from each other.

The inner rotary member 12 has a block in the form of a ball 22 mounted in a radial extending blind bore 24 therein and having a spring 26 disposed in the blind bore 24 for biasing the ball 22 radially outwardly.

Figure 1A:
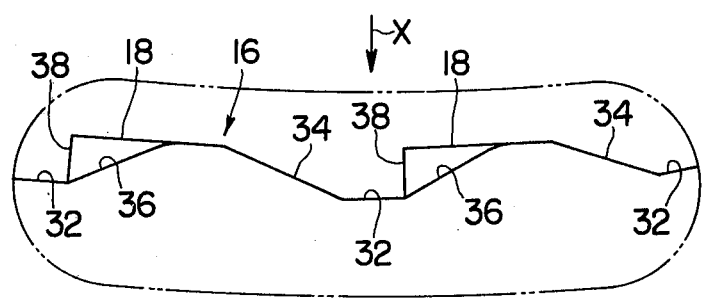
FIG. 1A is an enlarged, diagrammatic, view of an encircled portion of FIG. 1.
Figure 1B:
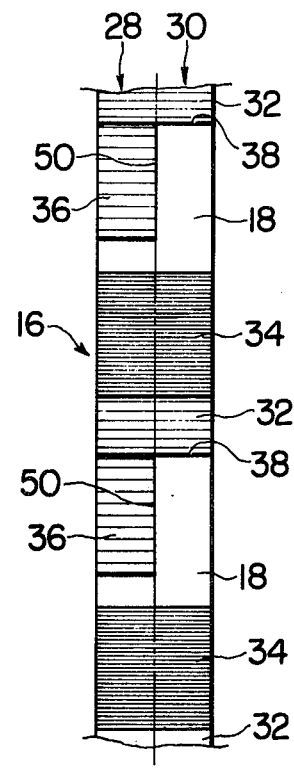
FIG. 1B is a diagrammatic top plan view of FIG. 1A as viewed along an arrow X.

The inner surface 18 of the outer rotary member has a first section 28 and a second section 30 axially adjacent to the first section 28 (see FIG. 1B). Formed in the inner surface 18 are a plurality of axial grooves (twelve in number in this embodiment) 32, running through the first and second sections 28 and 30 (see FIGS. 1A and 1B). A plurality, corresponding in number to the axial grooves 32, cam surfaces 34 are formed in the inner surface 18, each defining one side wall of one of the axial grooves 32 (see FIGS. 1A and 1B). A plurality, corresponding in number to the axial grooves 32, of second cam surfaces 36 are formed in the first section 28 of the inner surface 18, and each second cam surface 36 defines portion of an opposite side wall of one of the axial grooves 32 (see FIG. 1B). A plurality, corresponding in number to the axial grooves 32, of radially extending limiting surfaces 38 are formed in the second section 30 of the inner surface 18, and each limiting surface 38 defines the remaining portion of the opposite side wall of one of the axial grooves 32 (see FIG. 1B).

Mounted securely on the panel 10 is a piezoelectric unit 40 including therein a piezoelectric element, not shown, which upon application of an impact thereon, will produce high electric voltage on a high voltage lead line 42. Such an impact is applied to the piezoelectric element by means of a cam follower 44 cooperating with the cam lobes 20. The cam follower 44 is biased toward an illustrated projected position to abut adjacent one of the cam lobes 20 (see FIG. 1). Preferably, the cam follower 42 has such a configuration that it prevents clockwise, as viewed in FIG. 1, rotation of the outer rotary member 16, as will be readily understood from this Figure.

Preferably, the number of axial grooves 32 corresponds to a measure of the number of the cam lobes 20.

Preferably, in order to define the maximum angle (α) of rotation of the inner rotary element 14, the panel 10 has a pin 46 fixed thereto and the inner rotary member 14 is formed with an arcuate groove 48 for receiving the pin 46.

Figure 3:
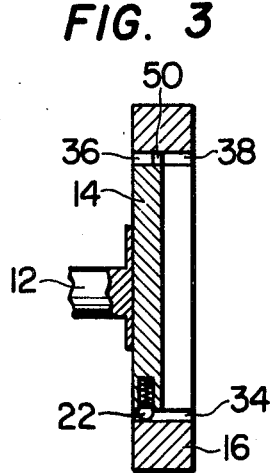
FIG. 3 is a diagrammatic sectional view taken through the line III—III of FIG. 1 showing an inoperative position of an inner rotary member.
Figure 4:
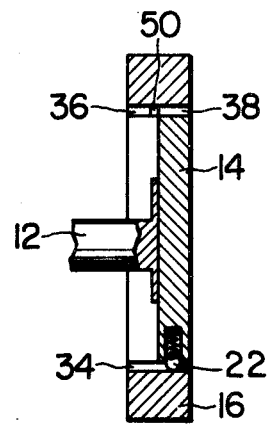
FIG. 4 is a similar view to FIG. 3 showing an operative position of the inner rotary member.

The inner rotary member 14 is axially movable between an inoperative position, as illustrated in FIG. 3, in which the ball 22 is in an operative engagement with the first section 28 and an operative position, as illustrated in FIG. 4, in which the ball 22 is in an operative engagement with the second section 30 (see FIG. 1B also). If desired, a suitable arrangement may be provided to bias the inner rotary member 16 toward the FIG. 3 position.

Preferably, a junction, as at 50, between each second cam surface 36 and the adjacent inner surface portion 18 is chamfered or rounded in order to permit the ball 22 to operate smoothly during axial movement of the inner rotary member 14 from the FIG. 3 position to the FIG. 4 position.

When, in operation, the inner rotary member 14 is FIG. 3 position, relative rotation of the inner rotary member 14 to the outer rotary member 16 in a clockwise direction, viewing in FIG. 1, is permitted because each cam surface 34 assists the ball 22 in moving out of one of the axial grooves 32, and relative rotation of the inner rotary member 14 to the outer rotary member 16 in a counterclockwise direction, viewing in FIG. 1, is permitted because each second cam surface 36 assists the ball 22 in moving out of one of the axial grooves 32. Thus, under this condition, the inner rotary member 14 can be rotated in the both rotational directions without rotating the outer rotary member 16.

Depressing by an operator the manually operable shaft 12 and the inner rotary member 14 to FIG. 4 position and rotating the inner rotary member counterclockwise, viewing in FIG. 1, will cause the outer rotary member 16 to rotate in the same rotational direction, because the ball 22 abouts the adjacent limiting surface 38 and this limiting surface prevents the ball from moving out of one of the axial grooves 32. Under this condition, torque is transmitted by means of the blind bore 24 in which the ball 22 is partly received and the adjacent limiting surface 38 which the ball 22 abuts. With the inner rotary member 14 depressed to take the FIG. 4 position, clockwise rotation, viewing in FIG. 1, of the inner rotary member relative to the outer rotary member 16 will not cause rotation of the outer rotary member 16 because each cam surface 34 assists the ball 22 in moving out of one of the axial grooves 32.

As will now be understood from the preceding description, counterclockwise rotation, viewing in FIG. 1, of the inner rotary member 14 under depressed condition shown in FIG. 4 will cause the cam lobes 20 formed on the outer circumference thereof to push the cam follower 44 downwardly to apply an impact to the piezoelectric element to cause the same to produce a high voltage. Therefore, it will be understood that a plurality of sparks, corresponding in number to the number of cam lobes abutted the cam follower 44 during a rotational of the outer rotary member 16, will be produced.

It will now be appreciated that the high voltage generating device according to the present invention is practically suitable, as an ignitor, for gas equipments because it will not provide a spark unless the inner rotary member is depressed and turned in a predetermined rotational direction, it will provide a series of sparks with relatively narrow manipulation angle, and it can be manipulated with little effort.

What is claimed is:

1. A high voltage generating device comprising:
a manually operable shaft;
an inner rotary member movable with said manually operable shaft;
an outer rotary member having an axis, said outer rotary member having an inner surface defining an axial bore in which said inner rotary member is disposed for rotation about and longitudinal movement along said axis and having a plurality of cam lobes formed on its circular outer circumference equidistant from each other;
said inner rotary member having a block mounted in a radially extending blind bore therein and having yieldable means for biasing said block radially outwardly;
said inner rotary member being movable within said outer rotary member along said axis between a first position in which said block is in operative engagement with a first section of said inner surface of said outer rotary member and a second position in which said block is in operative engagement with a second section of said inner surface;
said outer rotary member having a plurality of axial grooves formed in said inner surface and running through said first and second sections, and a plurality, corresponding in number to said axial grooves, of cam surfaces formed in said inner surface, each defining one side wall of one of said plurality of axial grooves, and adapted to assist said block in moving out of a corresponding one of said axial grooves upon rotation of said inner rotary member relative to said outer rotary member in one predetermined rotational direction;
said outer rotary member having a plurality, corresponding in number to said axial grooves, of second cam surfaces formed in said first section of said inner surface, each defining a portion of an opposite side wall of one of said plurality of axial grooves, and adapted to assist said block in moving out of a corresponding one of said axial grooves upon rotation of said inner rotary member relative to said outer rotary member in the opposite rotational direction to said predetermined rotational direction when said inner rotary member is in said first position;
said outer rotary member having a plurality, corresponding in number to said axial grooves, of limiting surfaces formed in said second section of said inner surface, each defining a portion of the opposite side wall of each of said axial grooves, and adapted to prevent said block from moving out of a corresponding one of said axial grooves to transmit a torque from said inner rotary member to said outer rotary member upon application of a torque to said inner rotary member in a manner tending to cause rotation of said inner rotary member relative to said outer rotary member in the opposite direction to said predetermined direction when said inner rotary member is in said second position;
a piezoelectric means for generating high voltage upon application of an impact thereto; and
a cam follower means cooperating with said plurality of cam lobes for applying an impact to said piezoelectric unit.

2. A high voltage generating device as claimed in claim 1, in which the number of said plurality of axial grooves corresponds to a measure of the number of said plurality of cam lobes.

3. A high voltage generating device as claimed in claim 1 or 2, further comprising a fixed pin and in which said inner rotary member is formed with an arcuate groove for receiving said fixed pin, said arcuate groove and fixed pin cooperating to define the maximum angle of rotation of said inner rotary member.

4. A high voltage generating device as claimed in claim 1 or 2, in which each of said cam lobe has a tooth like profile and in which said cam follower means has such a configuration that it prevents rotation of said outer rotary member in one rotational direction.

* * * * *